Feb. 22, 1949.   D. M. McQUEEN   2,462,527
PHOTOGRAPHIC ANTIHALATION ELEMENT
Filed Jan. 27, 1947
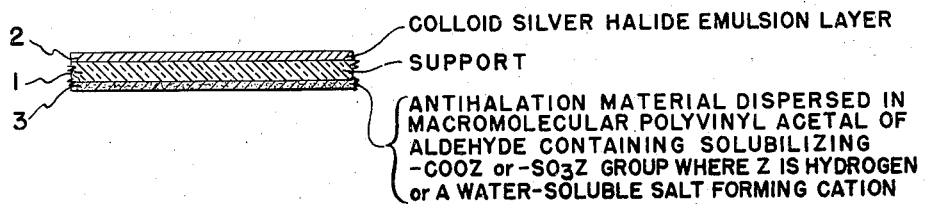
INVENTOR.
DAVID MALCOLM McQUEEN
BY
Lynn Barratt Morris
ATTORNEY Patented Feb. 22, 1949

2,462,527

UNITED STATES PATENT OFFICE 2,462,527

PHOTOGRAPHIC ANTIHALATION ELEMENTS

David Malcolm McQueen, Wilmington, Del., assignor to E. I. du Pont de Nemours & Company, Wilmington, Del., a corporation of Delaware Application January 27, 1947, Serial No. 724,711

5 Claims. (Cl. 95—8)

This invention pertains to photographic elements bearing novel, removable, antihalation layers. More particularly, it pertains to photographic film, etc., bearing developer-insoluble, water-soluble, antihalation layers.

An object of this invention is to provide new photographic elements having removable antihalation layers. Another object is to provide such elements wherein the antihalation layers do not come off during the alkaline development of the exposed elements. A further object is to provide such elements from economical materials. A still further object is to provide such elements with antihalation layers which have good aging characteristics. A still further object is to provide such elements which do not become insoluble or tacky on storage. Still other objects will be apparent from the following description of the invention.

The novel photographic elements of this invention comprise a support 1, a radiation sensitive (colloid-silver-halide) layer 2 and an antihalation layer 20 comprising an antihalation material e. g. dye or pigment dispersed in a water-soluble, alkaline developer-insoluble, macromolecular acetal of a hydroxyl polymer containing a plurality of recurring vinyl alcohol ($—CH_2—CHOH—$) units with an aldehyde containing a solubilizing group taken from the class consisting of $—COOZ$ and $SO_3Z$ where Z is hydrogen or a water-soluble cation e. g. alkali metal ammonium or amine salt group.

A practical method of forming the antihalation layer is as follows: The water-soluble, developer-insoluble macromolecular acetal polymer is dissolved in a mixture of water and a water-miscible alcohol in an amount of about 1 to 10% by weight of the mixed solvent and an antihalation material admixed therewith. The percent of alcohol in the mixed solvent should not exceed 95% by weight. Thus antihalation pigments or dyes may be added in the form of small particles and dispersed or milled into the solution. Water-tolerant or spirit-soluble dyes can be added from a solvent solution. The solution is then applied to or coated on the back of a film base by any of the conventional coating methods, e. g., coating from a hopper provided with a doctor blade, dipping, by transfer or beading rollers, spraying, etc., and the solvent allowed to evaporate. A layer in the order of 1 to 10 microns is generally sufficient. However, substantially thicker layers can be made if desired. A light-sensitive layer, e. g., a colloid silver halide emulsion layer, is then coated on the opposite side of the base.

The nature of light-absorption characteristics of the antihalation material for the layer will, of course, depend upon the particular characteristics of the emulsion. They are added in sufficient amounts to form an effective density which will stop the passage of the undesired light rays. Halation of blue-sensitive and ortho-chromatic emulsions can be minimized by the use of black and red nonhalation layers. Panchromatic emulsions, theoretically, require black nonhalation layers, although green and deep blue can be used advantageously. Natural occurring pigments of the above-mentioned colors may be used by this invention since the entire non-halation coating is removed during processing. Metallo-dye complexes and inorganic, colored compounds are likewise suitable if they are of appropriate colors and have no adverse effect on the photographic emulsion which comes into contact with the non-halation layer when rolled up.

The acetals used in the antihalation layers can be made by the reaction of a hydroxyl polymer containing a plurality of recurring $$—CH_2—CHOH—$$

acyclic chain units with an aldehyde containing a sulfonic acid or a carboxylic acid group under acetal-forming conditions until a water-soluble acetal is formed. For example, the acetalization may be conveniently carried out in solution or suspension in water or an organic solvent or diluent using a catalyst such as phosphoric acid, sulfuric acid, hydrochloric acid, etc. Suitable procedures and aldehydes are described in United States Patent 2,310,943 and in German Patent No. 643,650. The free acid groups can be converted into salt groups by a simple neutralization as described above and in the United States patent.

Partially and completely hydrolyzed polyvinyl alcohols of low, intermediate, and high viscosity having a molecular weight of 5,000 to 50,000 and hydrolyzed interpolymers of vinyl esters with one or less equivalent of a terminally unsaturated interpolymerizable organic compound can be used in preparing the hydrophilic vinyl alcohol acetals of aldehydes containing carboxylic or sulfonic acid groups. In general, such polymers having for each 100 carbon atoms between 20 and 50 free nonphenolic hydroxyl groups are useful.

Water-soluble, developer-insoluble macromolecular acetals of vinyl alcohol polymers useful in accordance with this invention are prepared by acetalization from (1) polyvinyl alcohol of high molecular weight (viscosity of 4% aqueous solution at 20° C., 40 to 60 centipoises), (2) polyvinyl alcohol of medium molecular weight (viscosity of 4% aqueous solution at 20° C., 15 to 30 centipoises) which may be substituted with ester groups, e. g., acetate, propionate groups, acetal groups, e. g., formal, acetal, propional, butyral, and benzal groups, and (3) 75–100% hydrolyzed interpolymers of vinyl acetate with 0.05 to 0.5 mol equivalents of terminally unsaturated mono-olefins, e. g., ethylene, such as described in United States Patent 2,386,347, and (4) completely hydrolyzed interpolymers of vinyl acetate with minor proportions (less than 50%) of polymerizable vinyl or vinylidene compounds, for example, vinyl chloride, vinyl cyanide, akyl methacrylates, e. g., methyl and ethyl methacrylates, e. g., methyl and ethyl methacrylate, etc., with an aldehyde containing free carboxylic or sulfonic acid groups or water-soluble salts of such groups.

The degree of substitution of the acetal groups may vary over a considerable range. Thus, vinyl alcohol polymers having between 10 and 50% of the hydroxyl groups acetalized with the aforedescribed aldehydes have been found useful. However, it has been found that the best results are obtained when between 10 and 35% of the hydroxyl groups are acetalized with the aldehydes. The total acetal content based on these figures will vary depending on the hydroxyl content of the polymer, but it has been found that the best results are obtained when between 5 and 17% of the carbon atoms of the polymer chain contain the acetal groups with a —COO— or —SO$_3$— radical. The acetals having this degree of substitution may be used in the form of the free acids but are preferably used in the form of the water-soluble salts which are soluble to the extent of at least 5% at temperatures below 30° C. in methanol or ethanol containing up to 50% of water.

While any aldehyde containing a free carboxylic or sulfonic radical may be used in preparing these acetals, those having a molecular weight of less than 200 are preferred as, in general, they react more readily and completely. These aldehyde-acids may be aromatic, aliphatic, or mixed aromatic-aliphatic.

The invention will be further illustrated by the following examples.

Example I

Four hundred and forty grams of medium viscosity polyvinyl alcohol is sifted into a stirred mixture of 30 cc. 85% phosphoric acid and 4000 cc. glacial acetic acid. This addition is followed by 330 grams recrystallized sodium benzaldehyde orthosulfonate monohydrate. The mixture is heated to 70° C. At 55° C. rapid thickening occurred and the rate of stirring is accelerated. Heating is continued about 2½ hours after the mixture becomes a homogeneous fluid. It is then diluted by addition to 6000 cc. ethanol with stirring. It is then poured into 20 liters of acetone and precipitates as a feathery white solid which is stirred and washed with acetone.

Fifty grams of colloidal carbon paste (manufactured by Binney & Smith) are mixed with 100 cc. water, warmed with stirring, filtered through felt and diluted with 25 cc. monomethyl ether of ethylene glycol. Five grams of the above acetal mixed with 100 cc. of water and 100 cc. of the monomethyl ether of ethylene glycol is added to the solution containing the colloidal carbon and 200 cc. of ethanol is added to the mixture. It is coated onto a cellulose acetate film base. A flowable gelatino-silver halide panchromatic emulsion is then coated on the front surface of said film. The film is exposed and developed in a standard alkaline N-methyl-p-amino-phenol sulfate-hydroquinone developer and washed in a bath of water at 68° F. The antihalation layer is readily dissolved and leaves no stain or pigment particles on the back of said film. No perceptible contamination of the developer bath is noted.

Example II

A coating solution of the composition

| | |
|---|---|
| Polyvinyl alcohol-o-sodium sulfobenzaldehyde acetal _____grams__ | 10 |
| Nigrosine SSJ (Colour Index #864) __do____ | 2 |
| Ethanol _____cc__ | 100 |
| Water _____cc__ | 20 | is prepared by dissolving the nigrosine in ethanol and mixing it with the acetal of Example I dissolved in a mixture of water and ethanol. The solution is coated onto the back surface of a transparent cellulose acetate film base and the layer is dried. A flowable gelatino-silver halide panchromatic emulsion is then coated on the front surface of said film. The film is exposed and developed in a standard alkaline N-methyl-p-amino-phenol sulfate-hydroquinone developer and washed in a bath of water at 68° F. The antihalation layer is readily dissolved and leaves no stain or pigment particles on the back of said film. No perceptible contamination of the developer bath is noted.

Example III

A coating solution having the following composition is prepared:

| | |
|---|---|
| Ink Blue B (Colour Index #707)__grams__ | 3 |
| Polyvinyl alcohol-o-sodium sulfobenzaldehyde acetal_____grams__ | 40 |
| Ethanol _____cc__ | 600 |
| Water _____cc__ | 400 |

The solution is coated onto the back surface of a cellulose acetate film base and allowed to dry. The front surface is coated with a gelatino silver halide panchromatic emulsion and the resulting film exposed and processed as in Example I with similar results.

Example IV

A coating solution like that of Example I is prepared by substituting Milori Blue for the Nigrosine of Example II. The antihalation layer is readily and completely removable after exposure and development in a water washing bath. A gentle swabbing of the layer during washing facilitates removal.

In general, any dye or pigment useful in antihalation layers can be used in the novel layers of this invention with the aforesaid acetals. Mixtures of dye and/or pigments can be used. The antihalation material, dye or pigment emulsions are usually gelatino silver halide emulsions which contain sensitizers, such as cyanine, carbocyanine, pseudo-cyanine, cyazine bases, and salts. That is, it must be absorptive of light of the wavelengths to which the emulsion is sensitive. In general, the dye should be added in an amount sufficient to give a photographic density of 0.2 to 0.8 or the amount of dyed layer should be sufficient to give such a density. When added from ethanol, etc., a very fine subdivision of the dye in the layer is obtained. As examples of additional useful dyes, mention is made of:

Auramine (C. I. 655)
Helianthin (C. I. 142, 146)
Brilliant Yellow S (C. I. 144)
Chrysoin (C. I. 143)
Acid Blue Black (C. I. 246)
Rhodamine (C. I. 749, 750, 751, 746, 753, 761, 763)
Fuchsin (C. I. 677)
Safranine G (C. I. 841)
Ponceau 6R (C. I. 186)
Crocein Scarlet (C. I. 277, 251, 286, 252, 291, 183)
Azorubin (C. I. 179)
Safranine O (C. I. 841)
Ponceau 2R (C. I. 79)
Metanil Yellow (C. I. 138)
DuPont Monastral Fast Blue BWD
DuPont Halopont Pink 2B
Methyl Violet Base (Colour Index #680)

The colour index referred to above and by the abbreviation C. I. is the Society of Dyers and Colourists Colour Index, edited by F. M. Rowe, first edition, January, 1924, published by The Society, Bradford, Yorkshire, England.

The invention is obviously not limited to use with cellulose acetate film bases for the novel antihalation layers can be used with practically any kind of support. The support can, for instance, be made of cellulose nitrate, cellulose acetate propionate, cellulose propionate, polyvinyl chloride, and copolymers thereof with monoethylenically unsaturated polymerizable compounds; polystyrene, acrylonitrile polymers, polyvinyl acetates, polyvinyl fluorides, polyamides, transparentized paper, etc.

The macromolecular acetals layers described above have the advantage that their solubility in water and/or alcohols simplifies their coating. They do not flake off or dissolve in alkaline developer solutions and color the developer solution. They are readily removable in water baths and can be removed after development or fixation. The acetals do not have any deleterious action on light-sensitive layers and are non-tacky. They show no tendency to stick to emulsion layers rolled adjacent thereto. The acetals are readily compatible with a large number of modifying materials so that a wide range of physical characteristics may be obtained.

As many widely different embodiments of this invention can be made without departing from the spirit and scope thereof, it is to be understood that the invention is not to be limited except as defined by the claims.

What is claimed is:

1. A photographic element comprising a support bearing a light sensitive silver halide emulsion layer on one surface and an antihalation layer on the other surface consisting of a water-soluble, alkaline developer-insoluble macromolecular acetal of a hydroxyl polymer having a plurality of recurring intralinear —CH$_2$—CHOH— groups with an aldehyde containing a solubilizing group taken from the class consisting of —COOZ and SO$_3$Z where Z is a member taken from the group consisting of hydrogen and a water-soluble salt forming cation, which is otherwise unsubstituted said acetal layer having uniformly dispersed therethrough finely divided antihalation material which is absorptive of the rays to which the emulsion layer is sensitive, said acetal being colorless and free from color former nuclei.

2. A photographic element comprising a support bearing at least one light sensitive silver halide layer on one surface and on the other surface an antihalation layer comprising a colorless, water-soluble alkaline developer-insoluble macromolecular acetal of a polyvinyl alcohol with an aldehyde containing a solubilizing group taken from the class consisting of COOZ and SO$_3$Z groups were Z is a member taken from the group consisting of hydrogen and a water soluble salt forming cation which is otherwise unsubstituted, said acetal layer containing an antihalation material which is absorptive of the rays to which the silver halide layer is sensitive, said acetal being free from color former nuclei.

3. A photographic element comprising a support bearing at least one light sensitive silver halide layer on one surface and on the other surface an antihalation layer comprising a colorless water soluble alkaline developer insoluble macromolecular acetal of a polyvinyl alcohol with an alkali metal sulfoaromatic aldehyde which is otherwise unsubstituted, said acetal layer containing an antihalation material which is obsorptive of the rays to which the silver halide layer is sensitive, said acetal being free from color former nuclei.

4. A photographic element comprising a film base bearing at least one light-sensitive silver halide layer on one surface and on the other an antihalation layer comprising a macromolecular acetal of polyvinyl alcohol with o-sodium sulfobenzaldehyde which has uniformly dispersed therethrough an antihalation material which is absorptive of the light rays to which the silver halide layer is sensitive.

5. A photographic element comprising a film base bearing at least one light-sensitive silver halide layer on one surface and on the other an antihalation layer comprising an acetal of a medium viscosity polyvinyl alcohol with o-sodium sulfobenzaldehyde which has uniformly dispersed therethrough an antihalation dye which is absorptive of the light rays to which the silver halide layer is sensitive.

DAVID MALCOLM McQUEEN.

REFERENCES CITED

The following references are of record in the file of this patent:

UNITED STATES PATENTS

| Number | Name | Date |
|---|---|---|
| 1,954,337 | Staud | Apr. 10, 1934 |

FOREIGN PATENTS

| Number | Country | Date |
|---|---|---|
| 546,631 | Great Britain | July 22, 1942 |